Figure 1:
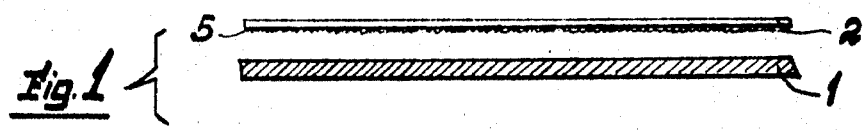

United States Patent [19]
Baldini

[11] 3,725,954
[45] Apr. 10, 1973

[54] METHOD OF MANUFACTURING GARMENT COLLARS OR LAPELS

[76] Inventor: Walter Baldini, Via Raffaello Sanzio 2/A, Milan, Italy

[22] Filed: Sept. 15, 1970

[21] Appl. No.: 72,286

[52] U.S. Cl. ........................................... 2/143, 2/98
[51] Int. Cl. ............................................... A41b 3/00
[58] Field of Search ............... 2/143, 131, 98, 243; 156/290; 161/148

[56] References Cited

UNITED STATES PATENTS

| | | | |
|---|---|---|---|
| 3,067,429 | 12/1962 | Centore | 2/98 |
| 2,126,822 | 8/1938 | Schneider | 2/143 X |
| 2,899,349 | 8/1959 | Jenkins | 156/290 X |

FOREIGN PATENTS OR APPLICATIONS

| | | | |
|---|---|---|---|
| 1,087,369 | 8/1954 | France | 2/143 |

Primary Examiner—James R. Boler
Attorney—Michael S. Striker

[57] ABSTRACT

An intermediate textile article for the fabrication of garment collars or lapels is produced by thermally bonding a first layer of textile material in uninterrupted surface-to-surface contact to one side of an inner layer of bonding material and by thermally bonding a second layer of textile material to the other side of the inner layer, but only at several spaced locations. The bond between portions of the inner layer and the second textile layer is thereupon destroyed to allow for insertion of a portion of an upper collar which consists of cloth and is secured to the first and second textile layers by sewing. Those portions of the inner layer and the second textile layer which are not overlapped by the inserted portion of the upper collar are bonded to each other in uninterrupted surface-to-surface contact.

1 Claim, 7 Drawing Figures

PATENTED APR 10 1973 3,725,954

INVENTOR.
WALTER BALDINI

METHOD OF MANUFACTURING GARMENT COLLARS OR LAPELS

DESCRIPTION OF INVENTION

This invention relates to a manufacturing process, particularly designed to ease and speed up preparation and fabrication of the collars for man's clothings with apparent and considerable practical and economical advantages, particularly in the mass-production field.

As it is well known, in the mass-production of man's clothings, the collar of jackets is formed of three elements suitably associated with each other, namely: (a) the upper-collar or "covering", which consists of the same fabric as the jacket itself; (b) the lower collar or "melton", which may be made out of a special fabric called "melton", or a felt; (c) the inner part, which is formed of a hempen cloth, or flax cloth or even mixtures of flax or hempen with synthetic yarns.

In order to form the collar proper, these elements are joined to each other by means of suitable sewings and quiltings, requiring, however, a considerable working time, which increases costs.

As a matter of fact, the conventional method involves the association of the "melton" or felt with a plurality of invisible points, which are sewn by special sewing machines leaving, however, the edges clear, so as to wedge between the "melton" and the hempen cloth the fabric of the upper collar or "covering" to then join all together by means of a specific stitch, called T-shaped stitch, which is done on the outer edge so as not to form any thickness.

It is well known that there is commercially available on the market a product called "thermo-adhering interlining", already introduced in the clothings mass-production field, consisting of a woven or non-woven element, provided on one of its faces with a synthetic resin or other equivalent product, melting under the action of the heat, ensuring the quick association of such interlining with the various parts of the clothings as reinforcement in lieu of the traditional reinforcing means.

The manufacturing process according to this invention provides for the execution of a particular industrial product, comprising, already associated with each other, a "melton" or felt, and a hempen cloth or other suitable "inner part" of the thermo-adhering type.

However, according to such process, the aforementioned association is only partial in order to permit to separate the felt from the hempen cloth at the edge of the collare to be made up in order to insert in it the edge of the upper collar.

More accurately, the manufacturing process according to the present invention provides for the association of the two elements by the use of a particular hot press, adapted to carry cut the thermo-fixing operation only a plurality of suitably distributed points instead of at the entire glue smeared surface.

In this manner, it will be possible to separate the two elements for inserting therebetween the upper collar edge, which will then be fixed by means of normal sewing.

The complete plasticization, adapted to join over the entire extension of the collar the felt to the hempen cloth will take place during the end ironing of the collar itself.

It is to be noted that for the preventive association of the "melton" or felts with the hempen cloth, or inner parts in general, according to the manufacturing process of this invention, schemes from time to time well defined should be followed in regard to both temperature, time and pressure and the configuration and distribution of the heating tips.

Figure 2:
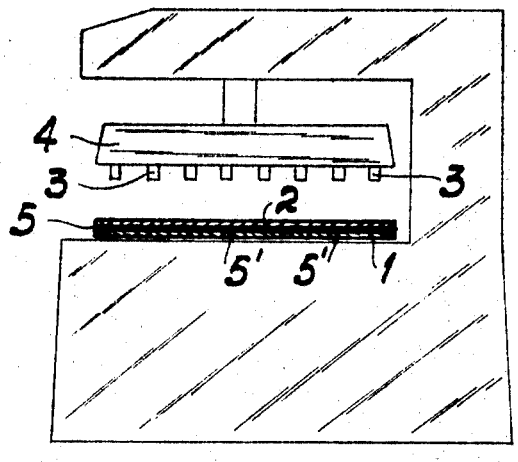
Figure 3:
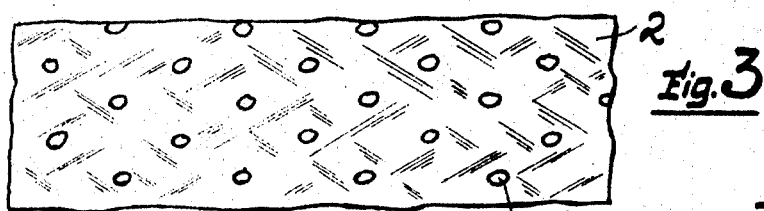
Figure 4:
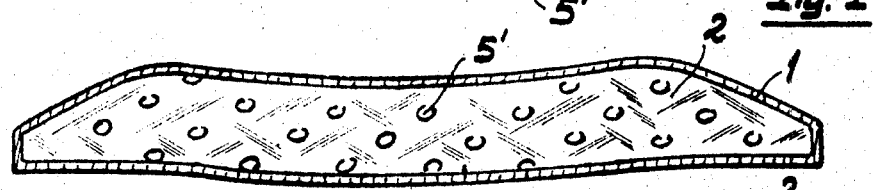
Figure 5:
Figure 6:
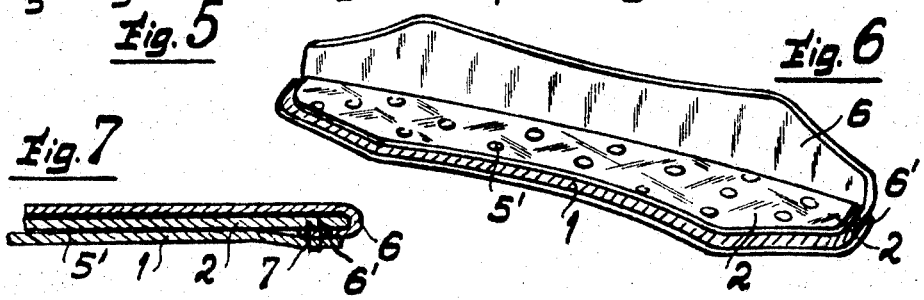
Figure 7:
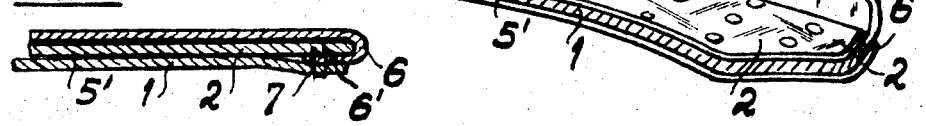

These and other features of the manufacturing process according to the present invention and the specific industrial product obtained therefrom will be better understood with the aid of the accompanying drawings, in which:

FIG. 1 shows a sectional and dissociated view of a portion of the industrial product according to this invention, FIG. 2 shows in schematic and merely exemplary manner the association operation between the lower collar (or "melton") and the hempen cloth (or other suitable inner part), carried out by means of a press fitted with heating tips, suitably distributed and spaced, FIG. 3 represents the composite product obtained from the manufacturing process according to this invention, viewed from the cloth in direction of the hempen colth layer, FIG. 4 shows the industrial product referred to above, cut in a suitable shape for the fabrication of a collar, FIG. 5 represents the same portion of the product according to this invention, in section, FIG. 6 shows the collar during its fabrication with the upper collar already between the other two elements, at the outer contour of the collar itself, and FIG. 7 represents suitably cut in a transversal direction to its outer edge, an already finished collar, completed with the sewing of the aforementioned hot ironed edge, so as to cause a complete melting of the glue and the association of the felt and hempen cloth over their entire extension.

Referring now to the aforesaid figures, it will be seen that the industrial product obtained according to the manufacturing process of this invention, includes three elements, namely: a first layer 2 comprising the layer of hempen cloth, often referred to as an "intermediate" layer; a second layer 5 of bonding material; and a third layer comprising the lower collar or "melton", associated with each other, by the action of the heating tips 3 of the press 4 on the suitable glue or bonding material layer 5, based on resins which may melt under heat.

Said glue means, uniformly distributed according to the present invention on the face of the hempen cloth 2, which is designed to be turned toward the felt 1, is caused to only act at well determined points 5', in which the assembly of the two elements is pressed by the heating tips 3 of the press 4.

The complete and definite association between the two aforesaid elements will take place instead only at the end of the collar execution, when it will be passed on to the final ironing.

With the industrial product according to this invention, in which the two elements 1 and 2 are strongly associated with each other only at the points 5' the individual portions of suitable shape for the fabrication of the various collars may be cut as needed.

Each collar is designed to be completed with an upper collar 6 (in the fabric of the cloth of which the collar is a component part) inserted at its outer edge 6' between the other two elements and then firmly associated with the same by stitching 7.

What I claim is:

1. A method of making a garment collar or lapel, comprising the steps of confining an inner layer of thermo-melting bonding material between two outer layers of textile material; thermally bonding one of said outer layers to said inner layer in uninterrupted surface-to-surface contact therewith; thermally bonding the other of said outer layers to said inner layer only at a plurality of spaced locations; destroying the bond at some of said spaced locations to thus separate portions of said inner layer and said other outer layer from each other; inserting a portion of a further textile layer between the separated portions of said inner layer and said other outer layer; securing the thus inserted portion of said further textile layer to at least one of said outer layers; and establishing an uninterrupted bond between the non-separated portions of said inner layer and said other outer layer.

* * * * *